Sept. 12, 1950 V. A. GALLOWAY ET AL 2,522,441
VEHICLE LOADING EQUIPMENT

Filed July 26, 1948 4 Sheets-Sheet 1

INVENTOR.
VICTOR A. GALLOWAY
REUBEN WILKES
BY
Cook + Robinson
ATTORNEYS

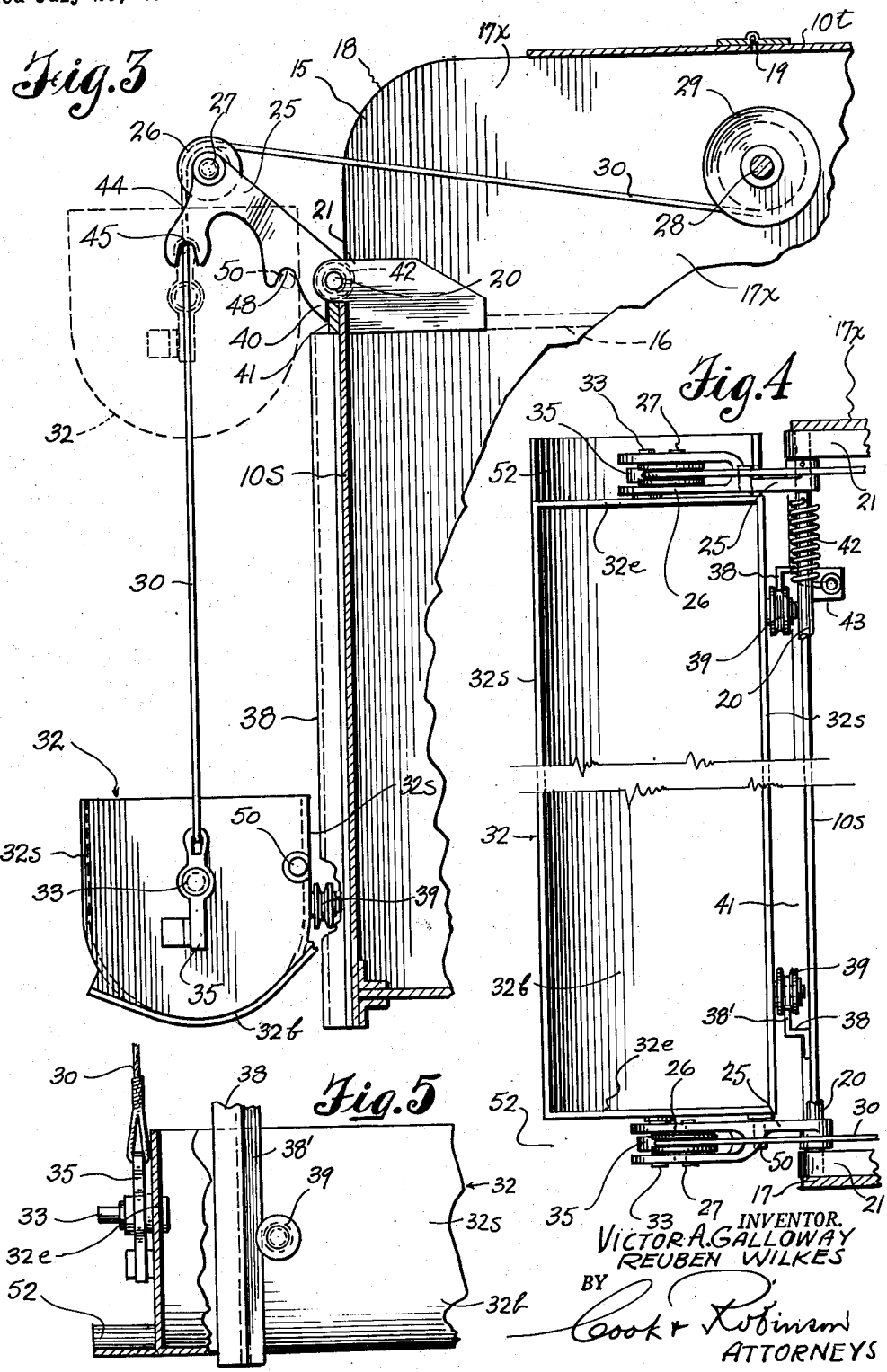

Sept. 12, 1950 V. A. GALLOWAY ET AL 2,522,441
VEHICLE LOADING EQUIPMENT
Filed July 26, 1948 4 Sheets-Sheet 3

INVENTOR.
VICTOR A. GALLOWAY
REUBEN WILKES
BY
Cook & Robinson
ATTORNEYS

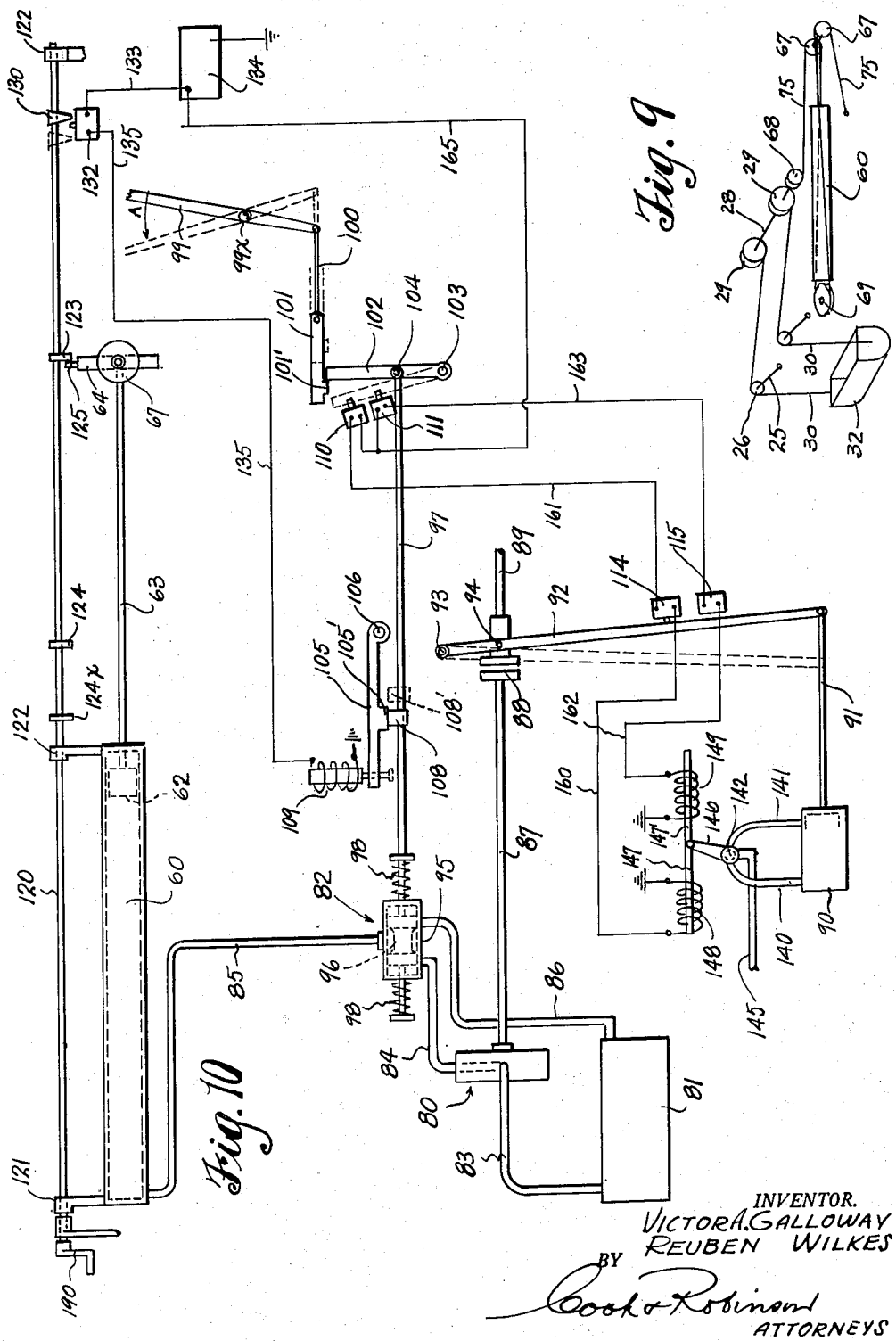

Patented Sept. 12, 1950

2,522,441

UNITED STATES PATENT OFFICE 2,522,441

VEHICLE LOADING EQUIPMENT

Victor A. Galloway and Reuben Wilkes, Seattle, Wash., assignors to Wilksway Loader, Inc., Seattle, Wash., a corporation of Washington Application July 26, 1948, Serial No. 40,684

10 Claims. (Cl. 214—67)

1

This invention relates to vehicle loading equipment and more particularly to improvements in loading means for garbage handling trucks and vehicles of similar character.

It is the principal object of this invention to provide a novel and simplified loading means for closed-body trucks; that will expedite the loading of collected material from garbage cans into the truck body; that will materially reduce the manual labor required in garbage collection and loading; that will mechanically lift and dump loads into the truck; that is practical in design and comparatively inexpensive to manufacture.

More specifically stated, it is the object of this invention to provide a closed body, rear end dumping garbage truck, having receiving openings in its top, and equipped with a loading mechanism corresponding to each opening, comprising a bucket of special design, equipped with and adapted to be lowered by suspending cables to a position that will permit the easy dumping of garbage from cans thereinto by the garbage collectors while standing on the ground, and which bucket may be elevated by its cables and caused to be moved into its corresponding opening and automatically dumped.

It is also an object of the invention to provide a garbage truck having a body equipped with receiving openings and loading buckets, as above described, wherein the buckets are designed to serve additionally as closures for the receiving openings, when the truck and its load is in transit.

Another object of the invention is to provide novel means for the control of the lowering, lifting, inverting and dumping of the buckets. Also to provide means for determining and changing the extent of lowering of the buckets, so as to best accommodate the workmen.

Other objects and advantages of the invention, not above specifically mentioned, are to be found in the details of construction and combination of parts, and in the mode of operation, of the loading equipment, as will hereinafter be fully described.

In accomplishing these and other objects of the invention, we have provided the improved details of construction, the preferred forms of which are illustrated in the accompanying drawings wherein:

Fig. 3 is a cross-sectional detail of a portion of the truck body, illustrating the bucket suspending means and the movement of the bucket from a lowered position toward its dumping position.

Fig. 4 is a top view of a suspended bucket and the bucket dumping and suspending means.

Fig. 5 is a partial elevation and sectional detail of the end portion of a bucket.

Fig. 9 is a diagram of the cable system for one bucket unit.

Fig. 10 is a diagram showing therein the wiring for the electrical control system for one bucket unit.

Referring more in detail to the drawings:

The body 10, as shown, is of box-like character, having opposite side walls, opposite end walls, a bottom and a top structure. In the present instance the body is shown to be equipped with two loading buckets at each side which accommodate the forward and rearward ends of the body, respectively. However, there might be one or more buckets at one or both sides, or one applied to the rear end of the body, without departing from the spirit of the invention. For each bucket, there is provided a corresponding receiving opening in the truck body top structure.

Figure 1:
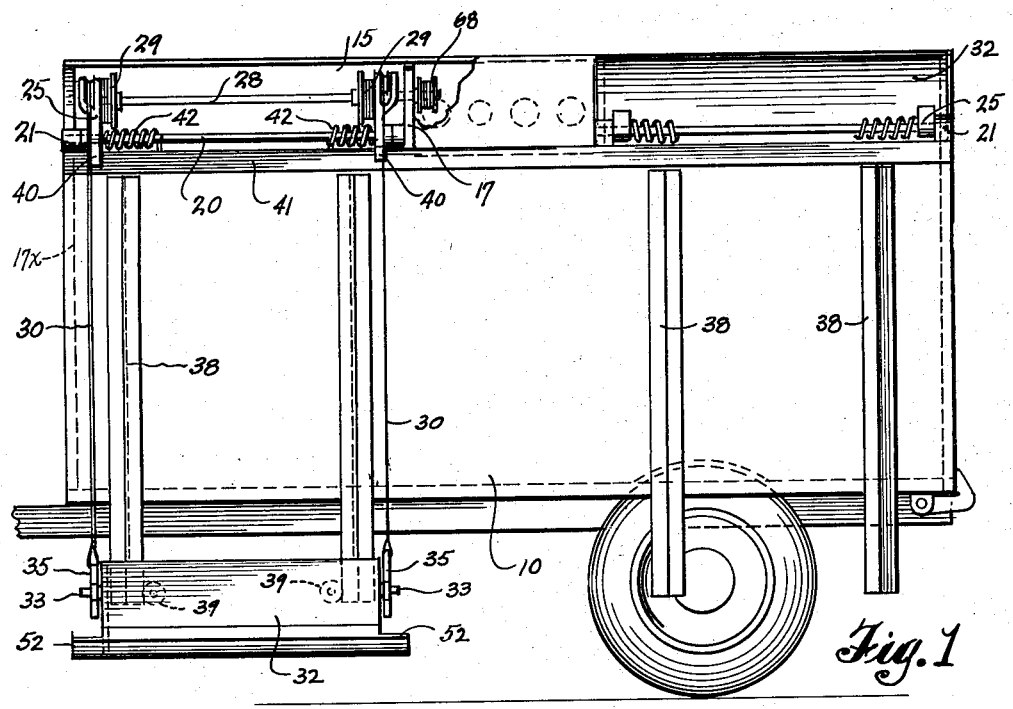
Fig. 1 is a side view of a garbage hauling truck embodying the improvements of the present invention therein and showing one of the loading buckets in a lowered position.
Figure 2:
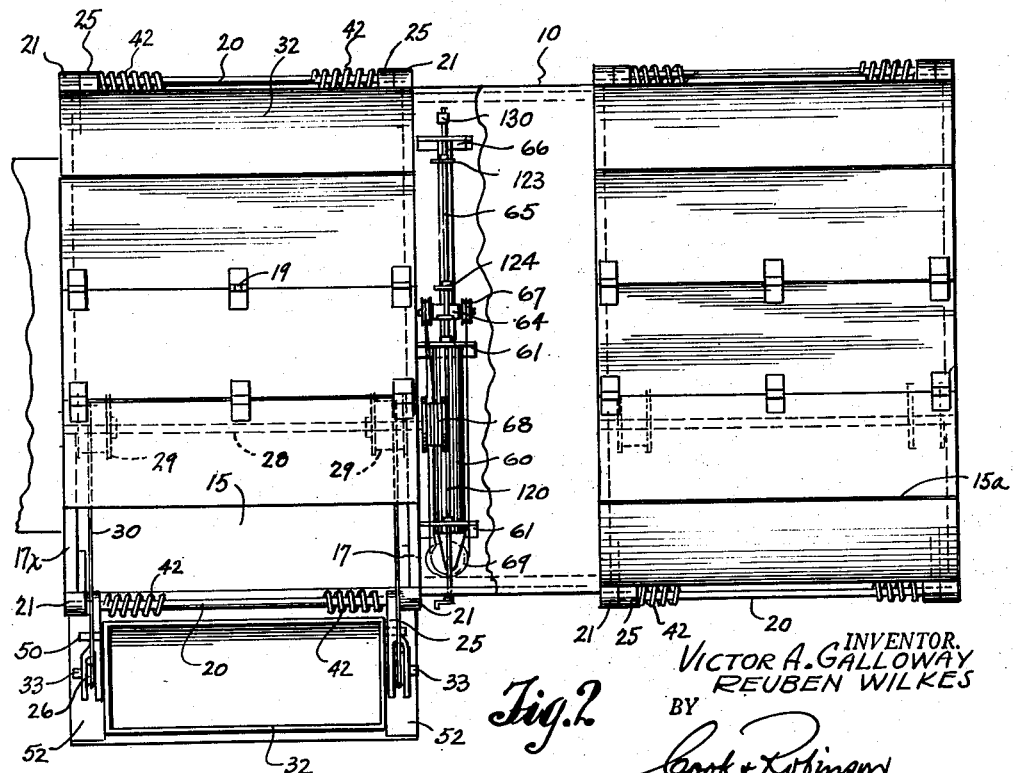
Fig. 2 is a top, or plan view of the body, showing the location of the receiving openings, and indicating in dotted lines the position of suspension of a bucket in loading position.

To adapt the body to use of two buckets at each side, as shown in Fig. 1, I provide its top structure with two receiving openings at each side. These openings, at the near side, in Fig. 1, are designated by reference numerals 15 and 15a, and it is noted that they are located adjacent the side wall and extend lengthwise of the body along front and rear end portions thereof. Between the filling openings, the top structure includes a transverse compartment, defined by a bottom 16 and vertical side walls 17—17. This compartment accommodates the bucket hoisting and lowering cylinders therein, as will later be more fully described.

Since all buckets herein used are alike in construction and in mode of use, and also have identical control means, only one unit will be described in detail, and it will be understood that this description will relate equally to all. For this description, attention is directed more particularly to Figs. 3 to 6, wherein the longitudinal side wall of the body is designated at 10s and the top wall of the body structure is designated at 10t, a part of which is hinged, as at 19, for upward opening; receiving opening 15 is shown to be formed partly in the top and partly in the side wall, and it is shown also that the corners of the end walls 17 and 17x which define the end limits of the opening 15 are rounded as at 18 to accommodate the curvature of the bucket when used as a closure for the opening, as will presently be understood.

Mounted along the lower edge of the receiving opening 15, slightly outside of the plane of the side wall of the truck, is a horizontal shaft 20 revolubly supported at its opposite ends in bearings 21—21 that are fixed to the walls 17 and 17x as shown in Fig. 4. Fixed on the shaft 20 adjacent the bearings 21 are paired lever arms 25—25, of like form and size, and extended from the shaft 20 in the same plane. At their outer ends, these lever arms mount small sheave wheels 26 on axles 27 that are parallel with the shaft 20.

Mounted between the walls 17 and 17x of the top structure, but near the central longitudinal vertical plane of the vehicle, is a drum shaft 28. This is parallel with shaft 20, and has cable winding drums 29—29 fixed thereon in alignment with the arms 25—25. Cables 30 are fixed to and wound about the drums and extend outwardly therefrom, passing over the sheaves 26 of corresponding arms 25, and thence depend downwardly therefrom, and at their lower ends have fixed connections with opposite ends of a loading bucket designated in its entirety by numeral 32.

The bucket 32 is of trough-like form. It has a semi-cylindrical bottom 32b, vertical opposite side walls 32s, and also vertical opposite end walls 32e. Approximately centrally of each of the end walls, stub axles 33 are fixed to extend outwardly therefrom, and pivoted on these axles are hanger rods 35, to the upper ends of which the bucket suspending cables 30—30 are attached, as in Figs. 3 and 5.

To guide the bucket in its travel between lowered and dumping positions, flanged guide rails 38 are attached vertically to the outsides of the side wall of the body, as observed in Fig. 4, and mounted on the inside wall of the bucket near its ends, are guide sheaves 39 that are grooved to receive lateral flanges 38′ of the guide rails therein to prevent endwise play and outward swinging of the bucket from the truck body. The rails 38 terminate just below the opening 15 so as not to interfere with the operation of dumping the bucket as presently explained.

To provide that the contents of a loaded bucket may be automatically dumped into the truck body through the opening 15 when the bucket has been lifted to a fully raised position, I have provided that during the operation of loading the bucket, the lever arms 25—25 will be held in positions inclined outwardly and upwardly from the shaft 20, as seen in Fig. 3, being retained against swinging downward from this position under weight of the bucket, by shoulders or stops 40 that are formed at the lower ends of the levers to engage against a horizontal rail 41 that is fixed to the side wall structure adjacent the lower edge of the opening 15. The arms are urged to and yieldingly retained in this position outward and upward inclination by means of one or more heavy coiled springs 42 that are applied about the shaft 20, each with one end fixed thereto, and its opposite end fixed to the body structure, for example, as has been indicated at 43 in Fig. 4.

Formed integral with each of the arms 25, at its outer end, is a downwardly directed branch or leg 44, which at its lower end is formed with a downwardly opening notch 45. Also, each lever arm 25 is formed in its under side near its inner end, with a downwardly opening notch 48. The arms 25—25 are spaced, one from the other, a distance that is slightly greater than the length of the bucket so that the bucket may be received between them in the dumping operation, and fixed on the opposite end walls of the bucket and inwardly from the stub axles 33 are studs 50 that are adapted, when the bucket is elevated by the cables to near dumping position, as in dotted lines in Fig. 3, to engage within the downwardly opening notches 48 of the lever arms. Then with continued winding in of the cables, the ends of the stub axles 33 are caused, as the bucket is swung beyond the dotted line position of Fig. 3, to be seated in the notches 45 at the lower ends of the branch arms 45; the parts then assuming the positions of parts as shown in dotted lines in Fig. 6. Further winding in of cables on their drums then causes the arms 25 to swing upwardly and inwardly, and thus, since the buckets are retained tightly against the arms under pull of the lifting cables and resistance of springs 42 acting through shaft 20, the bucket will be carried by the arms into the opening 15 in an inverted position as has been shown in Fig. 6, at which its load will be dumped.

It is shown also, in Figs. 4 and 5, that the bottom wall of the bucket 32 extends beyond the end walls 10e in the form of flanges 52, which are of such extent that, as the bucket moves through the opening 15, to its final limit of travel, the flanges will engage directly upon the rounded corner portions 18 of the walls 17 and 17x at the ends of the opening and stop farther inward movement of the bucket. The bucket in this position, as in Fig. 6, serves as a closure for the opening 15.

The bucket is retained in this closed position by the inward pull of the winding cables 30 thereon, as will presently be understood.

Figure 6:
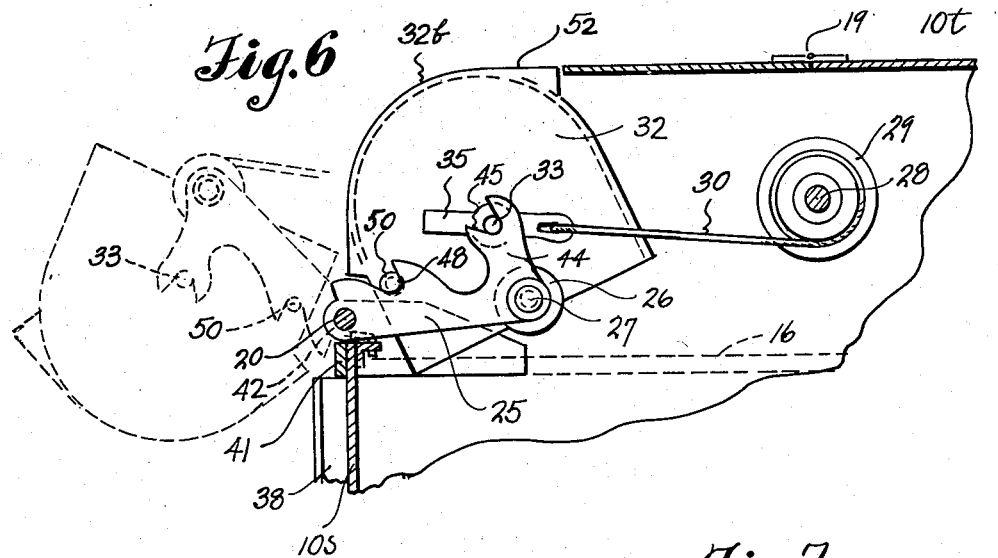
Fig. 6 is a cross-sectional view illustrating travel of the bucket through the receiving opening to an inverted, dumping position.

As soon as holding or winding tension of the cables 30—30 is released, the tension of the coiled springs 42 will operate to rotate the shaft 20 and thereby swing the arms 25—25 upwardly and outwardly from position of Fig. 6, carrying with them the bucket 32, which will be brought back to upright position and can be lowered to the desired extent by control of the drum winding shaft.

It is to be understood that by reason of the bucket being held between the lever arms against endwise movement, and also to travel in a definite arc as returned from dumping position, it will be carried back to an exact position for the guide sheaves to be engaged properly with the vertical guide rails 38.

The means for driving shaft 28 to control the bucket lifting or lowering operations comprise the following parts, which are shown in Figs. 7, 8, 9 and 10.

Located in the transverse compartment of the top structure of the body, for each of the buckets, is a hydraulic jack comprising a jack cylinder 60, horizontally disposed and supported and fixed in position transversely of the vehicle by brackets 61—61 at its opposite ends; these brackets being fixed to the bottom wall 16 of the compartment. The cylinder contains a piston 62 from which a rod 63 extends. At its outer end the rod is equipped with a cross head 64 movable on vertically spaced guide rods 65. The rods are fixed at their ends in one of the brackets 61 and in a similar bracket 66 spaced therefrom. The cross head mounts a pair of grooved sheave wheels 67—67 at opposite sides thereof as shown best in Fig. 8.

The drum shaft 28, corresponding to this particular jack, extends through the adjacent supporting wall 17 and at its end is equipped with a cable winding drum 68.

Figure 8:
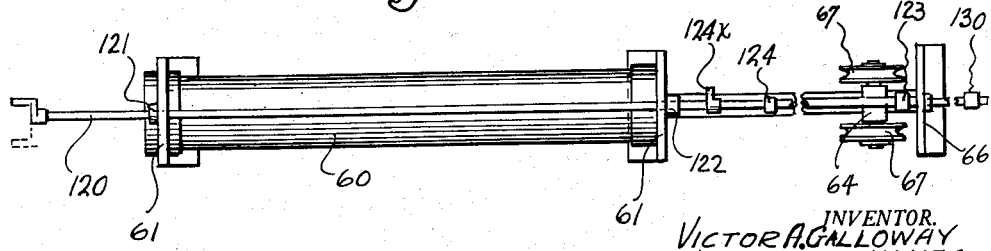
Fig. 8 is a top view of the same.

Mounted by that bracket 61 that supports the outer end of the cylinder, that being the end nearer the bucket which the cylinder controls, is a sheave wheel 69, and this is inclined as shown in Fig. 8 so as to bring its opposite edges substantially into alignment with the sheave wheels 67—67 as carried on the cross head.

Figure 7:
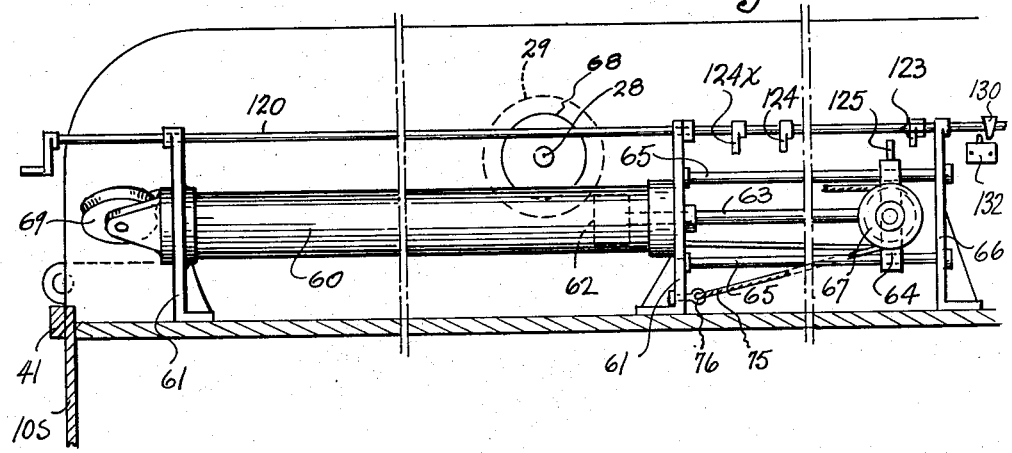
Fig. 7 is a cross-section of a portion of the body showing a side view of one of the bucket operating units.

A cable 75 is fixed, as at 76 in Fig. 7, to the adjacent bracket 61, and passes therefrom about one of the sheaves 67, thence to the opposite end of the cylinder and about sheave 69, thence back to the other end of the cylinder and about the other sheave 67, and then to the drum 68 about which it is wound and secured.

With the arrangement of cables heretofore described, the operation is as follows: Starting with the bucket in lowered position and the piston rod retracted, to raise and dump the bucket, hydraulic pressure medium is admitted to the outer end of the cylinder. This causes the piston to be moved and the piston rod to be extended. As the rod is extended, the cable 75, being secured at one end to bracket 61, will be unwound from drum 68, causing the latter and its shaft 28 to be rotated. Rotation of shaft 28 rotates the cable winding drums 29 and winds cables 30 thereon, thus lifting the bucket, 32, for example from the lowered position of Fig. 3 to the dotted line position of Fig. 3, at which the studs 50 at its ends engage in the sockets 48 of the lever arms 25. Continued winding in of the cables 30 then carries the bucket through the dotted line position of Fig. 6 to the dumped position, at which it closes the opening 15 through which it has moved.

Tension on the cables 75 and 30 will retain the bucket in this dumped position. With the retraction of the piston rod, the cable 75 will be paid back to the drum 68, allowing the tension of springs 42 to rotate the shaft 20 in a manner to swing the arms 25 outwardly, thus to return the bucket to the position shown in dotted lines in Fig. 6, and to return under its weight, to load receiving position.

The wiring of electrical control devices of the system and the piping connections for the hydraulic cylinder are shown best in Fig. 10, wherein 80 designates a suitable pump for delivery of a hydraulic pressure medium, such as oil, from a supply tank 81 through a control valve designated in its entirety at 82, into the outer end of cylinder 60.

The pump has its suction side connected by means of a pipe 83 with the tank 81, and its pressure side connected by a pipe 84 with one end of the cylindrical casing of valve 82. A pipe 85 leads from a central point of the valve casing to the jack cylinder 60 to supply the hydraulic medium from the pump thereto for extending the piston rod to lift the bucket, and a pipe line 86 leads from the other end of the valve casing back to the tank 81 for return flow of the pressure medium to permit retraction of the piston as for lowering the bucket.

The pump 80 has a drive shaft 87 and this is adapted to be connected, by means of a clutch 88, with a power take-off shaft 89 that preferably would be driven by the vehicle engine. The clutch 88 is normally disengaged, and is thrown into engagement to drive the pump by means of an operating connection with a booster 90 equipped with a piston and a piston rod 91 that is extended and retracted in accordance with the application of vacuum to opposite ends of the booster cylinder. The rod 91 is connected pivotally to the lower end of a clutch control lever 92 that has pivotal mounting at its upper end, as at 93, and at a point intermediate its ends, as at 94, has a connection with the clutch for shifting it between driving and released positions under control of the booster.

The control valve 82 comprises its cylindrical housing 95 in which a spool type valve 96 is reciprocally contained. This piston valve is actuated from a central neutral position in the cylinder to opposite end positions, designated as "lift" and "lower" positions, by a rod 97 that extends therefrom. When shifted to "lift" position, which would be to the left-hand end of the valve cylinder as seen in Fig. 10, pressure medium as supplied by the pump will be delivered from pipe 84 through the valve casing to cylinder 60 to cause the piston 62 to be moved for extending the piston rod for raising the bucket. When the valve is shifted from neutral position to the right-hand end of the valve, it will allow the pressure medium to flow from the cylinder 60 through pipe 85, the valve casing, and pipe 86, back to the supply tank for lowering the bucket. The valve rod 97 is urged by coiled springs, as at 98—98, acting against stops on the rod, to the neutral position. It is actuated to "lift" and "lower" positions by manual means, for example, by a hand lever 99 that preferably would be located at a position accessible to the vehicle operation. The hand lever has a pivotal mounting 99x spaced from its lower end and has a link 100 connecting its lower end with a slide 101 which is formed with a downwardly depending latch lug 101' adapted to engage with and actuate a shifting lever 102 for the valve rod 97.

The lever 102, as noted in Fig. 10, is normally vertically disposed, and is pivotally mounted at its lower end by a pivot bolt 103. It is pivotally connected intermediate its ends, as at 104, with the end of valve shifting rod 97, and its upper end is disposed in the path of travel of the lug 101' on the slide bar 101 as moved by hand lever 99.

When the valve rod 97 is actuated from a neutral setting either to "lift" or "lower" position, it will be held at that setting by a releasable latch device, shown in Fig. 10 as comprising a latch lever 105 that extends along the rod 97. At one end the latch lever is pivotally mounted by pivot 106. At its other end it has a depending lug 105' which, in normal setting of rod 97, rests on a stop collar 108 fastened on rod 97. When the rod 97 is actuated from neutral to either limit, the lug 105' will drop from support on the collar, thus to act as a latch to engage against an end thereof to retain the rod 97 at the position to which it has been actuated. The latch lever 105 is adapted to be lifted and the collar thereby released, by the energization of a solenoid 109, the armature of which has operative connection with the free end of the lever. The control of the solenoid will presently be explained.

The initiating of an operation for lifting a bucket from loading to a dumping position, and also the initiating of the operation of lowering the bucket from raised to loading position, is manually effected by the actuation of the hand lever 99, but in each instance the stopping of the operation and the retaining of the bucket either in its raised or its lowered position is automatically effected by means which will now be described.

It will be understood that in the movement of the valve control rod 97 from its neutral position, as shown in Fig. 10, to either the "raise" or "lower" position, the lever 102 will be swung on its pivot 103 to one side or the other. When it is swung to "raise" position, as shown in dotted lines in Fig. 10, it will be moved into operative contact with the actuators of two switches 110 and 111. Switch 110 is a "normally open" switch and 111 is a "normally closed" switch. Therefore, when engaged by lever 102 as the latter is actuated to "raise" position, the switch 111 will be opened and switch 110 will be closed.

Likewise, associated with the lever 92 that shifts clutch 88 between engaged and disengaged positions are switches 114 and 115. The switch 114 is a "normally closed" switch, while switch 115 is a "normally open" switch. When the clutch is disengaged, the lever 92, as shown in full lines in Fig. 10, engages the switches in a manner that closes the normally open switch 114, and opens the normally closed switch 115.

Associated with the hydraulic jack cylinder 60 and its piston rod, is a control rod 120. This is mounted for limited longitudinal shifting parallel with the travel of the piston rod in supports 121 and 122. Fixed on the control rod are spaced stops 123 and 124, and fixed in the cross head of the piston rods is a stud 125 which will engage the stop 123 when the piston rod moves through the final interval of its bucket raising movement, and will thus shift the rod 120 in that direction. Likewise, when the piston rod is retracted, the stud 125 will, with the final interval of retraction engage stop 124 and shift the rod 120 in that direction.

Fixed on the rod 120 is a switch contactor 130 which is adapted, with the shifting of the rod 120 in either direction, as above described, to engage the actuator of a switch 132 to momentarily close a circuit through the switch. Switch 132 is connected at one side by wire 133 with one side of a battery 134, the other side of the battery being grounded to the vehicle frame. The other side of the switch is connected by wire 135 with one side of the solenoid 109, and the other side of the solenoid is grounded on the vehicle frame. Thus, whenever the switch 132 is closed, it causes the solenoid to be energized to lift the latch lever 105 and allow the valve rod 97 to be returned from either set position, to its neutral position, by springs 98—98.

The booster cylinder 90 is connected at opposite ends by pipes 140—141 with a vacuum control valve 142. Valve 142 is connected with a source of vacuum through pipe 145. The valve is actuated to opposite limits by a lever 146 and this is connected to the armatures 147—147' of a pair of solenoids 148 and 149. When solenoid 148 is energized, the valve is actuated to admit vacuum to the cylinder to move the booster piston to shift the clutch from "disengaged" to "engaged" position. When solenoid 149 is energized, the position of the valve is changed to apply vacuum to the other side of the booster to cause the position of the clutch to be reversed.

The booster holds the clutch shift lever 92 at set position.

The wiring for electrical control of the system is as shown in Fig. 10, wherein it is seen that solenoid 148 is grounded at one side and is connected at its other side by wire 160 with one side of switch 114. The other side of switch 114 is connected by wire 161 with one side of switch 110. Solenoid 149 is grounded at one side and its other side is connected by wire 162 with one side of switch 115; the other side of switch 115 being connected to one side of switch 111 by wire 163. The other sides of switches 110 and 111 are connected to the battery 134 by wire 165.

Assuming the parts to be assembled as described, and the electrical and piping connections to be as indicated diagrammatically in Fig. 10, a cycle of operation would be as follows:

With the bucket in its normal, raised position and the piston rod fully extended, the parts would assume the positions shown in Fig. 10. The switches 110 and 111 here are in normal setting, while switches 114 and 115 are reversed from normal by reason of the position of lever 92. To lower the bucket, the operator pulls rearwardly on the lever 99, as indicated by arrow A, thereby shifting the slide 101 forwardly and, through the mediacy of the lug 101' on the slide, actuating the lever 102 forwardly and causing the valve shifting rod 97 to shift the valve piston 96 to a position that permits the pressure medium in the cylinder 60 to flow from the cylinder 60 through the valve casing and pipe 86 to the tank 81, thereby permitting the bucket, under its weight and the return action of springs 42, to move to lowered position. With the shifting of the rod 97 forwardly, the stop collar 108 moves to a position forwardly of the lug 105' on the latch 105, as at 108', the latch bar drops thereover, and thus the valve is held in "lower" position. As the piston rod 63 moves through its final retractive movement, the stud 125 on the cross head engages with the stop 124 on the control rod 120, moves the rod accordingly, and thus causes the switch contactor 130, by its movement, to momentarily close a circuit through the switch 132, thereby energizing the solenoid 109 to release the latch 105 and permit the valve piston 96 to be returned to its neutral setting. When the valve returns to neutral, this stops any further outflow of medium from the cylinder 60 and stops further lowering of the bucket.

When the bucket is to be raised, the operator pushes the lever 99 forwardly from dotted line position of Fig. 10, thereby through the mediacy of the slide 101 and the lug 101' pushing the lever 102 rearwardly, as to the dotted line position, and thus shifting the valve piston 96 to a position for the delivery of pressure medium by the pump through the valve casing to the cylinder 60. As the rod 97 is thus shifted, the collar 108 moves from beneath the latch lug 105', the latch drops, and the shift rod is then held by the latch in that position. Also, when the lever 102 is moved to this position, as shown in dotted lines, it contacts with and reverses the setting of the switches 110 and 111, thereby closing a circuit from battery 134 through switches 110 and 114 through the solenoid 148, which effects the actuation of valve 142 that admits vacuum to booster 90 through pipe 140, causing the clutch lever 92 to be moved to engage the clutch and set the pump in motion for delivery of pressure medium to the cylinder 60 for raising the bucket. As the piston rod 63 moves through its final travel of forward extension, the stud 125 on the cross head engages with the stop 123 on rod 120, shifts the rod forwardly, and causes the switch contactor 130, in moving from dotted line position to full line position (see Fig. 10), to momentarily close a circuit through the switch 132, thus to energize the solenoid 109 and release the latch 105 to permit the valve 96 to return to a neutral position, at which it retains the pressure medium in the cylinder. With the return of the valve 96 to neutral position, the lever 102 is swung back to normal and disengages the actuators of switches 110 and 111, so that they assume normal setting. Switch 110 opens, thereby opening the circuit through the solenoid 148. Switch 111 simultaneously closes a circuit from the battery through switch 115 and energizes solenoid 149. This causes valve 142 to be reversed and vacuum admitted to the opposite side of the booster through pipe 141 and the clutch thus disengaged to stop the pump. It will be understood that the pump operates only in a bucket raising operation.

The extent to which the bucket is lowered is dependent upon the location of the stop 124 on the rod 120. In the present instance, this stop is so located that the bucket will be stopped about three feet above the ground level. In order to provide for a farther lowering of the bucket and an automatic stopping at a lower level, for instance, when it is closely adjacent the ground, I provide a third stop 124X on rod 120, and I provide for rotating the rod 120 slightly, thus to swing the stop 124 out of the line of travel of the stud 125, so that, in the retraction of the rod, the stud 125, after passing the stop 124, will contact the stop 124X. Thus, a workman can make a selection of either stop 124 or stop 124X by the rotatable adjustment of the rod 120. This adjustment may be accomplished by a crank arm 190 in the outer end of the rod. The crank may be swung to one limit for the positioning of the stop 124 in operative position, and oppositely to another limit for positioning the stop 124X in operative position.

While we have illustrated and described the invention as constructed for the handling of garbage, it is anticipated that it be put to various other uses. Also, it is not the intent that it be restricted as to the type of vehicle, or size of vehicle, with which it is used, not to the number of buckets applied to any vehicle.

Having thus described our invention, what we claim as new therein and desire to secure by Letters Patent is:

1. The combination with a container body having a receiving opening, of a loading mechanism comprising an arm pivoted at one end adjacent the lower edge of the receiving opening for swinging through a limited arc in a vertical plane from outside to inside of the container through said receiving opening, a cable guiding means at the swinging end of the arm, a cable extending from within the container, through said opening and over said cable guiding means, a loading bucket suspended by said cable after passing over said cable guiding means at the outer end of said arm, and a cable winding means for winding the cable thereon to lift the bucket up to and against the arm and to hold the bucket and arm in a relatively rigid relationship under tension of the cable, and by continued inward winding, to cause the arm and bucket as engaged therewith to be swung into the container through said receiving opening to effect the dumping of the bucket.

2. The combination with a container body having a receiving opening, of a loading mechanism comprising an arm pivoted at one end adjacent the lower edge of the receiving opening for swinging in a vertical plane from outside to inside of the container through said receiving opening, means for limiting the extent of outward swing of the arm to a position above horizontal, a cable guiding means at the outer end of the arm, a cable extending from within the container outwardly through said opening and over said cable guiding means, a loading bucket suspended by the outer end of the cable from said arm, means for winding in the cable to lift the bucket up to and against the arm, and coacting means on the bucket and arm that will thereby be engaged and a holding connection effected between the bucket and arm that, under pull of the cable, renders them relatively rigid and whereby a continued winding in of the cable will cause the arm and bucket to swing into the container through said opening and the bucket to be inverted for dumping its contents into the container body.

3. A combination as recited in claim 2 wherein a spring means continuously urges the arm toward its outer limit of swinging for returning the arm and bucket to the outside of the container when winding tension on the cable is released.

4. The combination with a container body having a side wall, with a receiving opening therein at the top of the container body, of a loading mechanism comprising a pair of arms fixed in horizontally spaced relationship adjacent the lower edge of the receiving opening for upward swinging in vertical planes through said opening from outside to inside the container, means for limiting the outward swing of said arms, spring means urging the said arms to their outside positions cable guiding means at the outer ends of the arms, a pair of cables extended from within the container outwardly through said receiving opening and over and downwardly from the cable guide means on the said arms, a loading bucket suspended by the cables from the outer ends of said arms, a cable winding means to which the inner ends of the cables are attached and whereby they may be drawn in to lift the bucket up to and against the said arms, and then by continued inward drawing of the cables to cause the bucket to be carried by the arms to an inverted position within the container opening.

5. A combination as recited in claim 4 wherein said arms are provided at spaced intervals in their under sides with notches, and said bucket is provided at its ends with projecting studs to be seated in said notches by the lifting of the bucket up to and against the arms, to establish a fixed relationship between bucket and arms whereby the swinging of the arms from their outer limits to positions within the container under the pull of said cables will carry the bucket to an inverted position for dumping its contents into the container body.

6. A combination as recited in claim 4 wherein said arms are provided with downwardly opening notches in spaced relationship therealong, and said bucket has studs fixed in its ends adapted to be seated in said notches when the bucket is lifted against the arms as a means of establishing and maintaining a fixed relationship between bucket and arms as the latter are swung from outside to inside the container body, and thus to cause the bucket to be carried to dumping position within the opening, and spring means maintains outwardly acting pressure against the said arms to return them to outwardly extended positions and the bucket to a lowering position, when winding tension on the cables is relieved.

7. A combination as recited in claim 4 wherein said pair of arms and opposite end portions of said bucket are provided with parts adapted to be brought into engagement by the lifting of the bucket up to and against the arms, to establish a fixed relationship between bucket and arms, whereby the swinging of the arms through cable pull on the bucket from outside to inside the container will carry the bucket to an inverted position, and spring means acts yieldingly against said arms to maintain the fixed relationship of arms and bucket and to return the arms and bucket to outside the container when bucket lifting pull on the cables is relieved.

8. The combination with a container body having a side wall and a receiving opening in said side wall, of a loading mechanism comprising an arm pivoted at its lower end adjacent the lower edge of said opening for swinging in a vertical plane from outside to inside the container through said receiving opening, means for limiting the extent of outward swing of the arm, a cable guiding means at the outer end of the arm, a cable extended from within the container outwardly through said opening and over said guiding means, a bucket suspended by said cable from the end of the arm, means for winding in the cable to lift the bucket up to and against the arm, means for effecting a fixed relationship of arms and bucket while so engaged by pull of the cable, and whereby continued pull on the cable will cause the arm and bucket to swing to the inside of the container to dumping position, a guide rail on the side wall of the container, and means on the bucket for moving along said rail to prevent lateral or outward swinging of the bucket.

9. The combination with a container body having a side wall, with a receiving opening therein at the top of the container body, of a loading mechanism comprising a pair of arms fixed in horizontally spaced relationship adjacent the lower edge of the receiving opening for upward swinging in vertical planes through said opening from outside to inside the container, means for limiting the outward swing of said arms to positions above horizontal, cable guiding means at the outer ends of the arms, a pair of cables extended from within the container outwardly through said receiving opening and over and downwardly from the cable guide means on the said arms, a loading bucket suspended by the cables from the outer ends of said arms, a cable winding means to which the inner ends of the cables are attached and whereby they may be drawn in to lifting the bucket up to and against the said arms, and then by continued inward drawing of the cables to be carried by the arms to dumping position within the container, guide rails on the side wall of the container, and guide rail followers on the bucket to engage said rails to prevent lateral or outward swing of the bucket while not in holding contact with said arms.

10. A structure as in claim 9 wherein the guide rails terminate at their upper ends adjacent the lower edge of said opening and wherein the said arms carry the bucket in its return from dumping position to properly engage the said guide rail followers with said rails.

VICTOR A. GALLOWAY.
REUBEN WILKES.

REFERENCES CITED

The following references are of record in the file of this patent:

UNITED STATES PATENTS

| Number | Name | Date |
|---|---|---|
| 1,458,241 | Otterson | June 12, 1923 |
| 1,460,078 | Pullar | June 26, 1923 |
| 1,755,547 | Lima | Apr. 22, 1930 |
| 1,833,872 | Howard | Nov. 24, 1931 |
| 1,953,579 | Zeuthen | Apr. 3, 1934 |
| 2,417,696 | Linde | Mar. 18, 1947 |

FOREIGN PATENTS

| Number | Country | Date |
|---|---|---|
| 742,812 | France | Jan. 4, 1933 |